350-376 SR

XR 3,466,638
7R4029D

SEARCH ROOM

INVENTOR.
WILHELM ANACKER

BY John E. Dougherty Jr.
ATTORNEY

3466638
OR IN 365/55

Sept. 9, 1969 W. ANACKER 3,466,638

NONDESTRUCTIVE READOUT MAGNETIC MEMORY

Filed Dec. 28, 1965 2 Sheets-Sheet 2

3,466,638

NONDESTRUCTIVE READOUT MAGNETIC MEMORY

Wilhelm Anacker, Yorktown Heights, N.Y., assignor to International Business Machines Corporation, Armonk, N.Y., a corporation of New York Filed Dec. 28, 1965, Ser. No. 516,848
Int. Cl. G11b 5/62
U.S. Cl. 340—174 1 Claim

ABSTRACT OF THE DISCLOSURE

The memory includes a number of planes, each of which includes a plurality of rows of cores. The cores in each plane are aligned in rows arranged one above the other. A digit drive and sense conductor threads the cores in each row. A word drive conductor threads one core in each plane. A nondestructive interrogate drive conductor is provided for each plane in the form of a flat strip which is woven between the rows so that two segments of this conductor, above and beneath each core, apply a quadrature field to the cores during each readout operation. The adjacent segments of the interrogate conductor are arranged to form a transmission line which has a low character impedance.

The present invention relates to a magnetic memory and more specifically to an improved arrangement of an orthogonal drive conductor relative to the storage elements in a magnetic memory.

Most conventional magnetic memories contain a plurality of discrete core storage elements arranged in a two or three dimensional array. Information is selectively entered in the memory and the memeroy is then interrogated to recall the information entered under the control of a number of input and output conductors which are threaded through core storage elements. The interrogate operation in most magnetic core memories is destructive, that is the signals applied to the cores to read out the information stored in the memory destroy the information stored in the cores. If this information is to be rewritten in the memory, it is usually rewritten immediately after the interrogate operation. This rewriting step, of course, results in a slower over-all operating speed for the memory and there have been proposed many different methods and structural arrangements designed to achieve nondestructive readout of the core storage elements in an array. One such design is to arrange an interrogate conductor so that it applies to the core storage elements in the array an interrogating field which is at right angles to the information representing remanent flux orientation in the cores. This field because of this right angle relationship is usually termed an orthogonal or quadrature field, and produces a temporary change in the remanent flux in each core to which it is applied. This temporary flux change induces an output signal in a sense conductor threading the core. Upon termination of the orothogonal field the interrogated core reassumes its original state of flux orientation and no rewriting cycle is necessary.

Orthogonal field structures have been built in which the interrogate conductor is surrounded by a layer of magnetic ferrite material which though not necessary for the storage of information in the core structure, actually forms an integral part of this structure. This extra magnetic material lowers the signal requirements for the interrogate conductor by providing a flux closure path for the interrogate field. However, this advantage is realized at the expense of higher hysteresis losses in the memory. If no magnetic flux closure path is provided for the field of the interrogate conductor, extremely large current signals are required on this conductor due to the fact that large demagnetizing fields are created around the open flux structure.

In accordance with the principles of the present invention improved magnetic memories are provided which can be operated in a nondestructive mode, which do not require extremely large signals on the interrogate conductor, and which are compact and which do not involve in their operation high magnetic hysteresis losses. These advantages are accomplished by constructing the memory with the storage cores aligned in rows on both sides of the interrogate conductor. The return flux path for the interrogate field applied to one storage core element is provided by an adjacent storage core element. Stated another way, the interrogate conductor is arranged between the adjacent rows of aligned cores in the memory so that it is effective when energized to apply to the cores in both adjacent rows an orthogonal interrogate field which interrogates the cores in both rows. At the same time the cores in one row may be considered to provide a return flux path for the field applied to the cores in the other row. The impedance of the interrogate conductor is minimized by constructing the conductor in the form of a strip line. This strip line preferably has a width which is slightly less than the height of the cores in the rows between which it extends so that the interrogate field is applied across the entire height of these cores.

It is therefore a broad object of the present invention to provide improved magnetic memories of the type which include drive conductors that apply to the storage elements in the memory magnetic fields which are orthogonal to the remanent flux orientation in the storage elements.

It is another object of the present invention to provide an improved magnetic core memory which can be interrogated in a nondestructive mode.

A further object is to provide an improved nondestructive readout magnetic memory employing a strip line interrogate conductor so arranged that it has a low characteristic impedance and can be driven by relatively small signals during nondestructive readout operations.

Another and important object of this ievention is to provide a compact, nondestructive readout memory which can be fabricated in bulk form.

The foregoing and other objects, features, and advantages of the invention will be apparent from the following more particular description of preferred embodiments of the invention as illustrated in the accompanying drawings.

Figures 1, 2, 3:
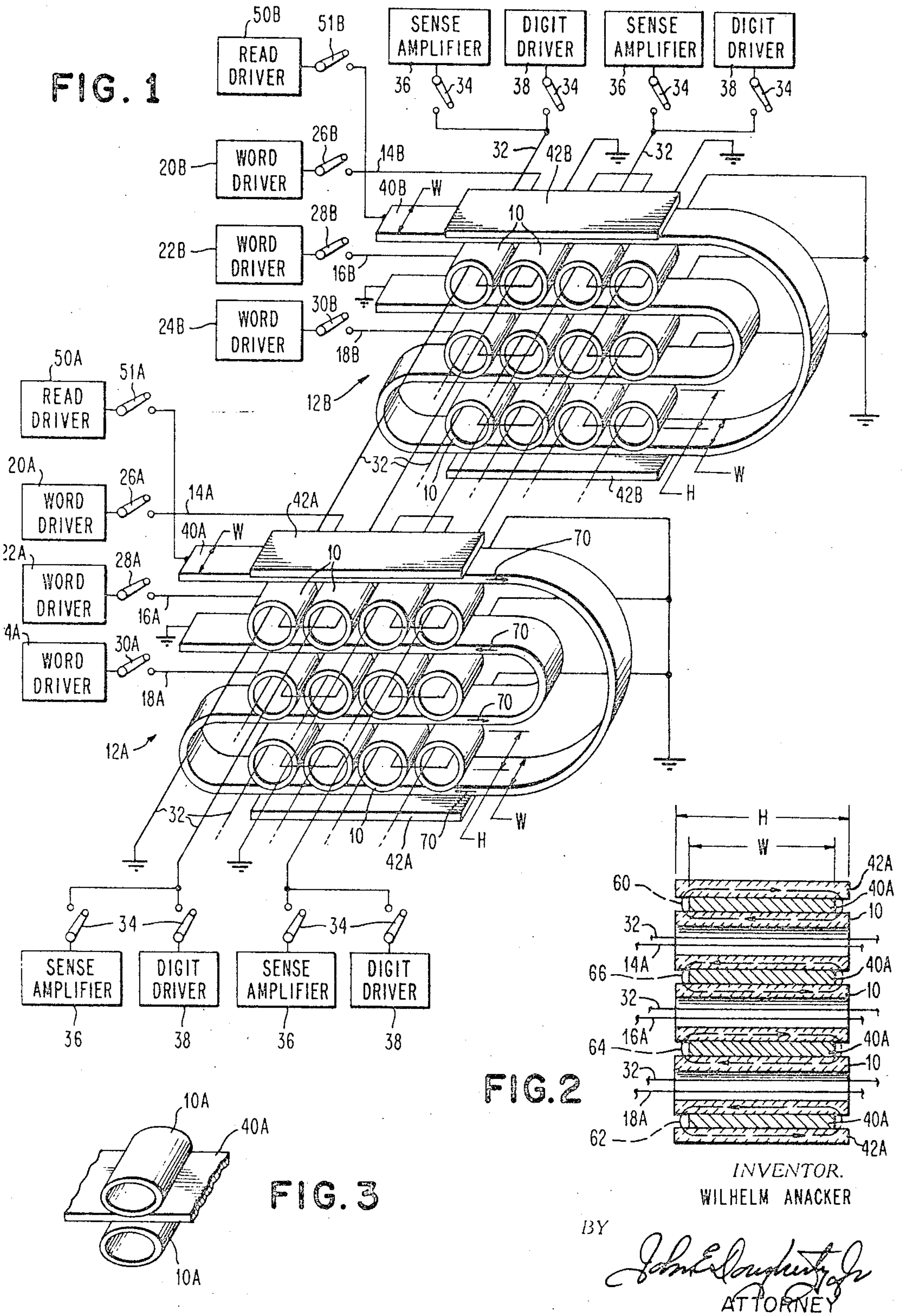
FIG. 1 is a somewhat schematic diagram showing of an embodiment of a magnetic core memory fabricated in accordance with the principles of the present invention.
FIG. 2 is a sectional view through one plane of the memory of FIG. 1 showing the flux closure around the interrogate conductor during a readout operation.
FIG. 3 shows an embodiment of a particular geometry for the core storage element in an array constructed in accordance with the principles of the present invention.

Referring now to FIG. 1, there is shown in somewhat schematic form a magnetic memory constructed in accordance with the principles of the present invention. This memory is made up of a number of cores 10 of magnetic storage material arranged in planes 12A and 12B, only the front and rear ones of which are shown in the drawing in order to provide a clearer illustration of the physical structure of the planes and the manner in which the drive and sense conductors are arranged relative to the storage cores in the planes.

Though the storage cores 10 in the memory are arranged in three dimensional form from a geometrical standpoint, that is the memory is made up of a plurality of planes with each plane including rows and columns of cores, the arrangement of the drive and sense conductors is such that the memory is actually operated from an electrical standpoint in a two dimensional mode. More specifically considering plane 12A as an example, this plane includes three horizontal rows and four vertical columns of cores, it being, of course, understood that the small number of cores here shown is for the purpose of illustration. In actual practice many more cores are included in a plane. Three word drive lines 14A, 16A and 18A each of which threads the cores 10 in an associated row of plane 12A apply the signals for selecting the particular row or rows of the plane into which information is to be written during a write operation. The word drive lines 14A, 16A and 18A receive their signals from word drivers 20A, 22A and 24A respectively under the control of switches illustrated at 26A, 28A and 30A. A similar arrangement of word drivers, controlling switches and word drive lines is provided for plane 12B of the array wherein like reference numerals are employed with the appended letter being changed from A to B.

A plurality of conductors 32 which serve the dual function of digit drive lines and output digit sense lines extend through the memory with there being one conductor for each core position in a plane of the memory. Since each of the planes shown includes 12 cores, there are 12 conductors 32. Each of these conductors is connected through a switch 34 to either a sense amplifier 36 or a digit drive 38. Again to avoid over complicating the drawings at the expense of clarity of presentation, only the switch, sense amplifier, and digit driver circuitry for the four conductors 32 in the top row in each plane is shown. The circuitry for the first and third cores is at the top of the drawing and that for the second and fourth cores at the bottom of the drawing.

Each of the planes 12A and 12B is provided with a readout conductor 40A, 40B in the form of a strip line which is arranged so that it passes between the rows of the cores. At the top and bottom of each plane, magnetic keepers 42A, 42B are provided and these keepers serve a function which is explained in detail below.

Writing operations in the memory of FIG. 1 are carried out using the conventional half select mode of operation of magnetic storage cores. The information to be written, for example, in the top row of the memory, is applied by the four digit drivers 38. If a binary one is to be written, the digit driver applies through the associated switch 34 to the drive line 32 a half select signal of proper polarity. No signal is applied if a binary zero is to be written. The word represented by the four bits on lines 32 is written in the top row of cores in either plane 12A or 12B. Assuming the word is to be written in the upper row of plane 12A, word driver 20A applies a half select signal of proper plurality through the switch 26A to the associated word line 14A to thereby apply a half select pulse to each of the cores 10 in the top row of the memory. This half select pulse does not by itself disturb the state of the cores to which it was applied, but when applied in coincidence with a half select signal on one of the digit lines 32 the core is switched to its binary one state. It is here assumed that all of the cores have been reset to the binary zero condition prior to the writing operation.

Particular note is to be made of the fact that each of the winding word drive lines 14A, 16A, 18A, 14B, etc. is threaded through adjacent cores in the associated row in the opposite direction. This simplifies the winding procedure. Because of the fact that the word drive winding is passed in opposite directions through associated cores, the signals applied by the digit drivers 38 to lines 32 also apply half select signals of opposite plurality to adjacent cores.

The readout operation is accomplished by applying to each of the storage cores a magnetic field which is at right angles to the normal flux orientation of the cores. More specifically each core 10 has its flux remanently oriented in a closed path around the core in either a clockwise or a counterclockwise direction storing either a binary one or a binary zero. The orthogonal field is produced by signals applied, for example, by a read driver 50A through a switch 51A to the interrogate conductor 40A for plane 12A. This field passes through the cores at right angles to the direction in which the remanent flux is oriented in the cores and thereby decreases the remanent flux in each core. This decrease in remanent flux is sensed by the associated sense conductor 32 to produce an output indicative of the state of the core. The direction of the decrease in flux is determined by the original storage state of the core and, therefore, the polarity of the signal induced on the conductor 32 associated with the core indicates the storage state of the core.

The interrogate operation is a nondestructive operation performed by the application of a signal to the interrogate conductor 40A or 40B according to which plane is to be read out. Each interrogate conductor is arranged to pass next to all cores 10 in the associated plane of the array so that each time the conductor for a plane is energized output signals are produced on all of the 12 conductors 32 indicating the information stored in the 12 cores in the plane. At this time switches 34 at the bottom and top of the array connect lines 32 to sense amplifiers 36. Though the actual flux state for a binary one is in one direction for the first and third cores and in an opposite direction for the second and fourth cores in a row, with the sense amplifiers placed as shown, like polarity pulses reaching the sense amplifiers indicate the same binary information.

In the write operation described above digit signals are applied only to the drive lines 32 in the upper row of the memory. It is also possible during a single write operation to enter information in all of the rows of one plane of the memory by energizing all the digit conductors 32 with the appropriate information representing signals and at the same time energizing all of the word drive lines for the plane. Information may be simultaneously entered in one row of one plane and a different row of another plane by selectively energizing the word lines for the selected rows in the selected planes coincidently with the application of the information representing signals to digit lines 32.

Each of the interrogate conductors 40A, 40B is in the form of a flat strip line which is arranged to pass in close proximity to each of the cores 10 in the associated plane. The arrangement of the cores relative to interrogate conductor 40A is more clearly shown in FIG. 2. The flux paths for the interrogate flux applied by the four segments of interrogate conductor 40A is represented at 60, 62, 64 and 66. The flux from the interrogate conductor 40A is presented with a relatively low reluctance path since there is magnetic material above and below the conductor as it passes through the array. The upper keeper 42A forms a return path for the interrogate flux 60 applied to the upper portion of cores 10 in the top row. Similarly, the lower keeper 42A provides a return path for the flux 62 applied to the lower section of the cores in the lower row. In the middle of the array the flux 64 provided by the segment of the interrogate conductor 40A passing between the lower and middle rows of cores passes through the upper portion of the lower row of cores and the lower portion of the middle row of cores. Similarly, the flux 66 surrounding the segment of conductor 40A passing between the upper and middle row of cores passes through the upper portion of the cores in the middle row of the lower portion of the cores in the top row.

Thus, it can be seen that a return path is provided for the flux which is applied to each core to effect a nondestructive readout. This return path is provided without adding extra magnetic material except at the top and bottom of the array where keepers 42A are mounted. In the remainder of the array the cores in adjacent rows provide return flux paths for each other. The presence of this return flux path reduces signal requirements for the interrogate conductor and allows nondestructive readout to be achieved with smaller signals. At the same time both the upper and lower sections of each core are, during the readout operation, subjected to quadrative flux to therefore change the flux linking the associated sense line 32 and produces a significant output signal.

In the preferred embodiments shown herein the strip line interrogate conductor has a width W which is only slightly less than the height H of the cores in the array. Though not absolutely essential to achieve the desired nondestructive readout, more efficient use is made of the quadrative flux to obtain signilcant output signals where the width of the interrogate conductor is substantially equal to or slightly less than the height of the cores in the array.

A further advantage of the arrangement shown is that the interrogate conductor 40A is in the form of a strip line which presents a low characteristic impedance to the interrogate signals applied by driver 50A through the associated switch 51A. The strip line is arranged so that the current flows in adjacent segments of the line, as indicated by arrows 70, in opposite directions. Each segment of the strip line in effect forms a return path for the adjacent segment of the line.

As pointed out above, the interrogate operation is nondestructive so that upon termination of the interrogate signal applied, for example, to interrogate conductor 40A, the cores 10 return to the original storage condition. The cores can be reset prior to a write operation using the same mode of operation as has been described above for a write operation with the exception that signals of proper plurality are applied coincidently to the word lines 14A, 14B, etc. for the selected planes and rows and to the digit drivers 32 to reset the selected cores to the binary zero flux condition. In the illustrative embodiment of FIG. 1 though only the digit drivers and sense amplifiers are shown for the upper row of cores in the array, similar circuitry is provided for each of the other rows to allow writing or resetting of an entire plane of the memory at one time. If the particular application in which the memory is to be employed requires operation on only one row of cores at one time, only a single group of sense amplifiers 36 and digit drivers 38 are necessary and gating circuitry is provided to selectively connect the conductors 32 to the appropriate sense amplifiers 36 and digit drivers 38 according to which row of the memory is selected for the write reset or interrogate operation.

As has been pointed out above, significant advantages have been realized with the structure of FIG. 1 in that adjacent cores in the array supply return flux paths for each other during the quadrature type interrogate operation. Though circular cores are shown in the embodiment of FIG. 1, further advantages can be realized with a structure such as shown in FIG. 3 where the cores designated 10A are fabricated in an elliptical geometry. With this type of geometry a greater portion of the flux along the linear length of the interrogate conductor 40A is essentially surrounded by magnetic material and thus, even smaller interrogate signals may be used.

Figure 4:
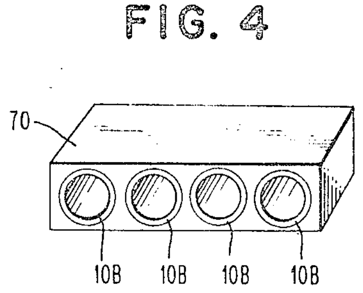
FIG. 4 shows a further embodiment of a bulk type storage device including four core storage elements useable in the memory of the present invention.

Another embodiment of the invention is illustrated in FIG. 4 wherein one row of cores, here designated 10B, for a memory of the type shown in FIG. 1, is shown to be formed by a block of nonmagnetic material 70 in which the cores 10B forming the storage elements are embedded. The structure of FIG. 4 is particularly applicable to bulk type of memories using very large numbers of cores. It can be readily seen that with this type of structure, word drive lines 14A, 14B, etc. need not be in the form of wires but may be actually plated through the cores 10B. The connections between cores can be made on the front and back surfaces of block 70 using printed circuit type techniques. Similarly, printed circuit type techniques may be used to lay down the strip line interrogate conductor on the to pand bottom of the block.

Figure 5:
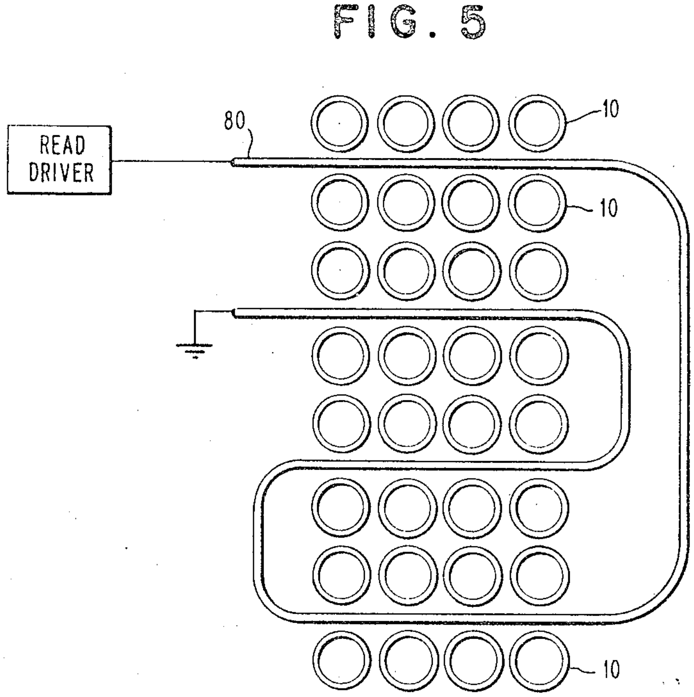
FIG. 5 shows a further embodiment of the invention illustrating a different manner of extending the interrogate conductor through the magnetic memory.

A further embodiment of the invention is shown in FIG. 5, this illustration being confined to a single plane in a memory. Again the core storage elements are designated 10 and here the interrogate conductor is arranged differently than in the previous embodiment and is designated 80. Since the operation for this embodiment for writing and resetting is the same as FIG. 1, the word drive lines, digit lines and associated circuitry are not shown here. The interrogate line 80 of FIG. 5 is similar to that of FIG. 1 in that it is in the form of flat strip line, which is arranged to extend back and forth between adjacent aligned cores in the memory. Interrogate line 80 differs from that previously shown in that it extends only between alternate pairs of rows of cores in the memory. With this type of arrangement the interrogate conductor 80 applies an interrogating flux to only one section of each core. This interrogating flux is sufficient to produce a significant output on the digit sense line threading the core (not shown). By arranging the interrogate conductor so that it passes only between alternate pairs of rows of cores, the over-all length of the conductor is, of course, less than in the embodiment of FIG. 1 in which the interrogate conductor passes between each pair of rows. This shorter conductor allows for speedier operation. However, since the adjacent segments of the interrogate conductor are separated by a large distance, the conductor presents a somewhat higher characteristic impedance than is the case with the embodiment of FIG. 1. The embodiment of FIG. 5 is further advantageous in that with this type of arrangement it is not necessary to use keepers above and below the uppermost and lowermost rows in the memory. With the arrangement shown a return flux path is provided for each core in the array by an adjacent core in the array without the addition of any magnetic material.

It should be emphasized that though in the embodiments herein disclosed the strip line conductor arranged to apply orthogonal magnetic fields to storage elements on either side of the conductor is used only as an interrogate conductor, the practice of the invention is not limited to this particular use. The novel structure may also be employed to advantage in magnetic memories of the type wherein an orthogonal field is applied to the magnetic storage elements to control writing operations in the memory. In memories of this type the same strip line can be employed to perform both functions and there is no need for a separate word drive line for the memory.

While the invention has been particularly shown and described with reference to preferred embodiments thereof, it will be understood by those skilled in the art that various changes in form and details may be made therein without departing from the spirit and scope of the invention.

What is claimed is:

1. A magnetic memory comprising (a) a plurality of memory planes each containing a plurality of individual magnetic storage cores;

(b) each plane of said memory including at least a first group of cores in each plane aligned in a first row, a second group of cores aligned in a second row below said first row, and a third group of cores in each plane aligned in a third row beneath said second row;

(c) a plurality of digit conductors for said memory each threaded through the cores in one of said rows of one of planes, and being threaded through the adjacent cores in the row in opposite directions;

(d) a plurality of word conductors for said memory each threading one core in each plane of the memory;

(e) means for energizing said word and digit conductors to store information in the cores in the memory;

(f) interrogate conductor means for said memory for nondestructively interrogating the cores in the memory;

(g) said interrogate conductor means including one flat stripline interrogate conductor for each plane of the memory;

(h) each said interrogate conductor including at least first, second, third and fourth connected segments;

(i) said first segment extending above the first row of cores in the plane, the second segment extending between the first and second rows of cores in the plane, the third segment extending between the second and third rows of cores in the plane, the fourth segment extending beneath the fourth row of cores in the plane;

(j) and means for selectively energizing said interrogate conductors to cause the segments thereof to apply quadrature magnetic fields to the cores in the plane of the selected interrogate conductor with the cores in each row being subjected to the magnetic field of both the one of said segments above that row and the one of said segments beneath that row;

(k) each of said cores being elliptical in shape whereby a large portion of the annular length of each core is adjacent the interrogate conductor segments which apply said quadrature fields to the core;

(l) and the width of each of said interrogate conductor segments being less than the length of said cores.

References Cited

UNITED STATES PATENTS

| | | | |
|---|---|---|---|
| 3,351,923 | 11/1967 | Cray et al. | 340—174 |
| 3,371,326 | 2/1968 | Fedde | 340—174 |

BERNARD KONICK, Primary Examiner

B. L. HALEY, Assistant Examiner